US010184636B2

(12) United States Patent
Shin et al.

(10) Patent No.: US 10,184,636 B2
(45) Date of Patent: Jan. 22, 2019

(54) HEAD LAMP FOR VEHICLE INCLUDING MOISTURE REMOVING APPARATUS

(71) Applicant: Hyundai Motor Company, Seoul (KR)

(72) Inventors: Jik Soo Shin, Incheon (KR); Ki Hong Lee, Seoul (KR); Keon Soo Jin, Ulsan (KR); Byoung Suk Ahn, Gwacheon-si (KR); Jung Wook Lim, Seoul (KR); Jai Hak Kim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 15/364,096

(22) Filed: Nov. 29, 2016

(65) Prior Publication Data

US 2018/0073701 A1 Mar. 15, 2018

(30) Foreign Application Priority Data

Sep. 13, 2016 (KR) ........................ 10-2016-0118130

(51) Int. Cl.
*B60Q 1/00* (2006.01)
*F21S 45/33* (2018.01)

(52) U.S. Cl.
CPC ..................................... *F21S 45/33* (2018.01)

(58) Field of Classification Search
CPC ............. F21S 45/33; F21S 45/30; F21S 45/50
See application file for complete search history.

(56) References Cited

U.S. PATENT DOCUMENTS

| | | | | |
|---|---|---|---|---|
| 4,809,144 | A | 2/1989 | Suzuki | |
| 5,230,719 | A * | 7/1993 | Berner | F24F 3/1411 165/4 |
| 2005/0157514 | A1 | 7/2005 | Brinkmann | |
| 2006/0150817 | A1 * | 7/2006 | DeGuiseppi | B01D 53/261 96/108 |

FOREIGN PATENT DOCUMENTS

| | | | |
|---|---|---|---|
| JP | 2005-282979 | A | 10/2005 |
| JP | 2009-021245 | A | 1/2009 |
| KR | 20-0122066 | | 10/1998 |
| KR | 10-2002-0055070 | A | 7/2002 |
| KR | 10-2013-0080374 | A | 7/2013 |
| KR | 10-2014-0049901 | A | 4/2014 |
| KR | 10-2014-0049903 | A | 4/2014 |

* cited by examiner

*Primary Examiner* — Andrew Coughlin
(74) *Attorney, Agent, or Firm* — Morgan, Lewis & Bockius LLP

(57) ABSTRACT

A head lamp for a vehicle including a moisture removing apparatus may include a moisture removing apparatus, moisture generated in the head lamp is removed by a moisture absorbent, wherein the moisture absorbent is dried, such that moisture absorbing performance of the moisture absorbent is restored, continuously maintaining a smooth moisture absorbing function. In addition, the moisture generated during drying the moisture absorbent is not again introduced into the head lamp, but is discharged to the outside, blocking the moisture from being generated in the head lamp.

8 Claims, 3 Drawing Sheets

HEAD LAMP FOR VEHICLE INCLUDING MOISTURE REMOVING APPARATUS

CROSS REFERENCE TO RELATED APPLICATION

The present application claims priority to Korean Patent Application No. 10-2016-0118130, filed Sep. 13, 2016, the entire contents of which is incorporated herein for all purposes by this reference.

BACKGROUND OF THE INVENTION

Field of the Invention

Various embodiments of the present invention relates to a head lamp for a vehicle including a moisture removing apparatus removing moisture generated in the head lamp and restoring moisture absorbing performance to allow a smooth moisture absorbing function to be continuously maintained.

Description of Related Art

Generally, a vehicle includes a lighting apparatus for allowing a driver to see things in a driving direction well at the time of being driven at night and informing other vehicles or other road users of a driving state of the vehicle. A head lamp called a head light, which is a lighting lamp serve to irradiate light to a front course to which the vehicle moves, requires brightness that may confirm an obstacle on a road positioned at a distance of 100 m in front of the vehicle at night.

As an amount of water introduced into the head lamp when it rains or it snows is rapidly increased, moisture is generated in the head lamp. The moisture shortens a lifespan of the head lamp and reduces transmissivity of light to cause a risk in safety driving at the time of driving the vehicle at night.

The moisture in the head lamp as described above is generated due to a temperature difference between inner and outer portions of the head lamp. That is, a temperature of an inner portion of the head lamp rises due to lighting of the head lamp or heat of an engine, and air in the inner portion of the head lamp of which the temperature rises contains a larger amount of moisture. Particularly, when it rains or the vehicle is washed, cold water directly cools the head lamp, and a temperature of an inner surface of the head lamp drops to a dew point or less, such that the moisture is cloudily generated.

In order to remove the moisture generated in the head lamp, a method of optimizing a position of a vent hole for an air flow has been suggested. However, this method is not effective since the air flow is not smooth in the case in which a shape of an inner portion of the head lamp is complicated.

As another method, there is a method of preparing a moisture absorbent in the head lamp. However, as the moisture absorbent continuously absorbs the moisture, a moisture absorbing function of the moisture absorbent is gradually deteriorated, and the moisture absorbed by the moisture absorbent is discharged into the head lamp at the time of naturally drying the moisture absorbent, thereby deteriorating generation of the moisture.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a head lamp for a vehicle including a moisture removing apparatus removing moisture generated in the head lamp using a moisture absorbent and restoring moisture absorbing performance of the moisture absorbent to allow a smooth moisture absorbing function to be continuously maintained.

According to an exemplary embodiment of the present invention, there is provided a head lamp for a vehicle including a moisture removing apparatus, including: a lamp housing in which an air inlet and an air outlet are formed; a moisture absorbent mounted adjacent to the air outlet in the lamp housing and absorbing moisture in the lamp housing; a heating device mounted adjacent to the moisture absorbent and heating the moisture absorbent at the time of applying electric power thereto to remove the moisture absorbed by the moisture absorbent; and a ventilation device having an inside space surrounding the moisture absorbent and the heating device, mounted to be connected to the air outlet, and allowing moisture discharged by the moisture absorbent dried by the heating device at the time of applying the electric power thereto to be discharged through the air outlet.

The air inlet may be formed at an upper side of the lamp housing and the air outlet may be formed at a lower side of the lamp housing, such that the air inlet and the air outlet are spaced apart from each other.

The moisture absorbent may be configured to absorb the moisture, and be configured to be reusable by discharging water at the time of being heated.

The heating device may be a positive temperature coefficient (PTC) element mounted adjacent to the moisture absorbent and having a temperature rising at the time of applying the electric power thereto.

The ventilation device may include: a case formed to have an inside space, mounted to be connected to the air outlet, and having a gateway formed therein so that air in the lamp housing is introduced into the inside space; a first blocking film mounted in the gateway of the case and opening or closing the gateway and a second blocking film mounted in the air outlet and opening or closing the air outlet; and a blower mounted in the case and blowing the air.

The blower and the air outlet may be positioned in the case to face each other, and the gateway may be positioned so as not to interfere with a path on which the blower and the air outlet face each other.

The blower may be mounted at a front end portion of the case, the air outlet may be formed at a rear end portion of the case, and the gateway may be formed at an upper end portion of the case.

The first blocking film may be rotatably mounted in the gateway, may be maintained to open the gateway at an initial position, and may close the gateway by the blown air generated by the blower.

The second blocking film may be rotatably mounted in the air outlet, may be maintained to close the air outlet at an initial position, and may open the air outlet by the blown air generated by the blower.

The head lamp for a vehicle including a moisture removing apparatus may further include a controller applying the electric power to the heating device and the ventilation device to control turn-on/off the heating device and the ventilation device, wherein the controller applies the electric power to the heating device and the ventilation device for a predetermined time at the time of starting up the vehicle.

According to another exemplary embodiment of the present invention, there is provided a moisture removing apparatus for a head lamp for a vehicle, including: a moisture absorbent mounted in a lamp housing in which an air inlet and an air outlet are formed and absorbing moisture in the lamp housing; a heating device mounted adjacent to the moisture absorbent and heating the moisture absorbent at the time of applying electric power thereto to remove the moisture absorbed by the moisture absorbent; and a ventilation device having an inside space surrounding the moisture absorbent and the heating device, mounted to be connected to the air outlet, and allowing moisture discharged by the moisture absorbent dried by the heating device at the time of applying the electric power thereto to be discharged through the air outlet.

The methods and apparatuses of the present invention have other features and advantages which will be apparent from or are set forth in more detail in the accompanying drawings, which are incorporated herein, and the following Detailed Description, which together serve to explain certain principles of the present invention,

Figure 1:
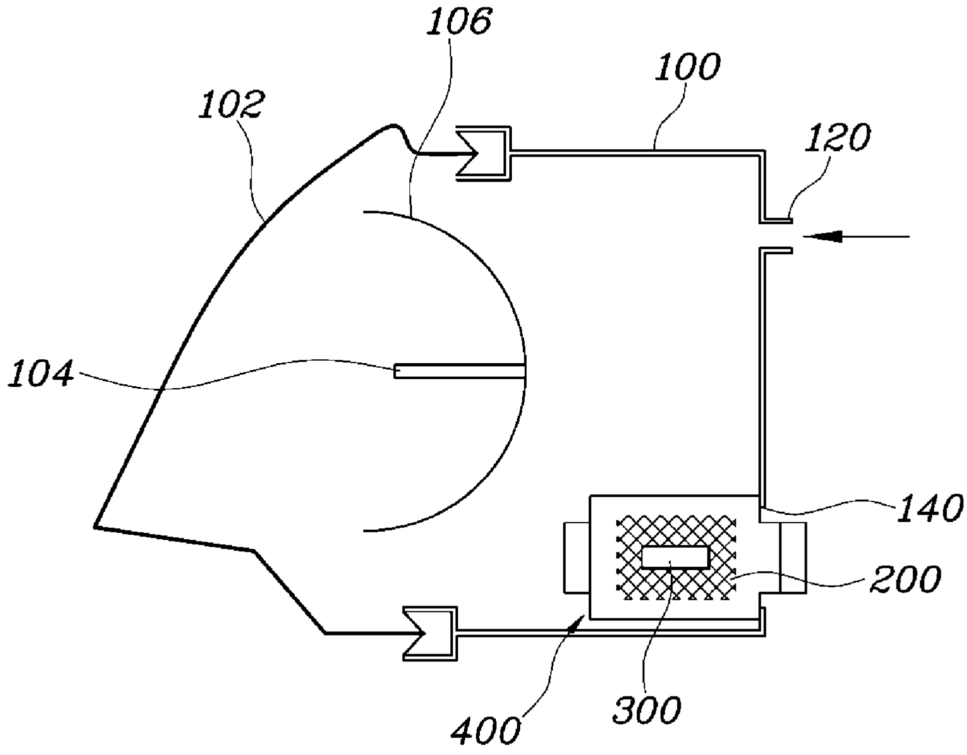
FIG. 1 is a view illustrating a head lamp for a vehicle including a moisture removing apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a head lamp for a vehicle including a moisture removing apparatus according to an exemplary embodiment of the present invention will be described with reference to the accompanying drawings.

Figure 2:
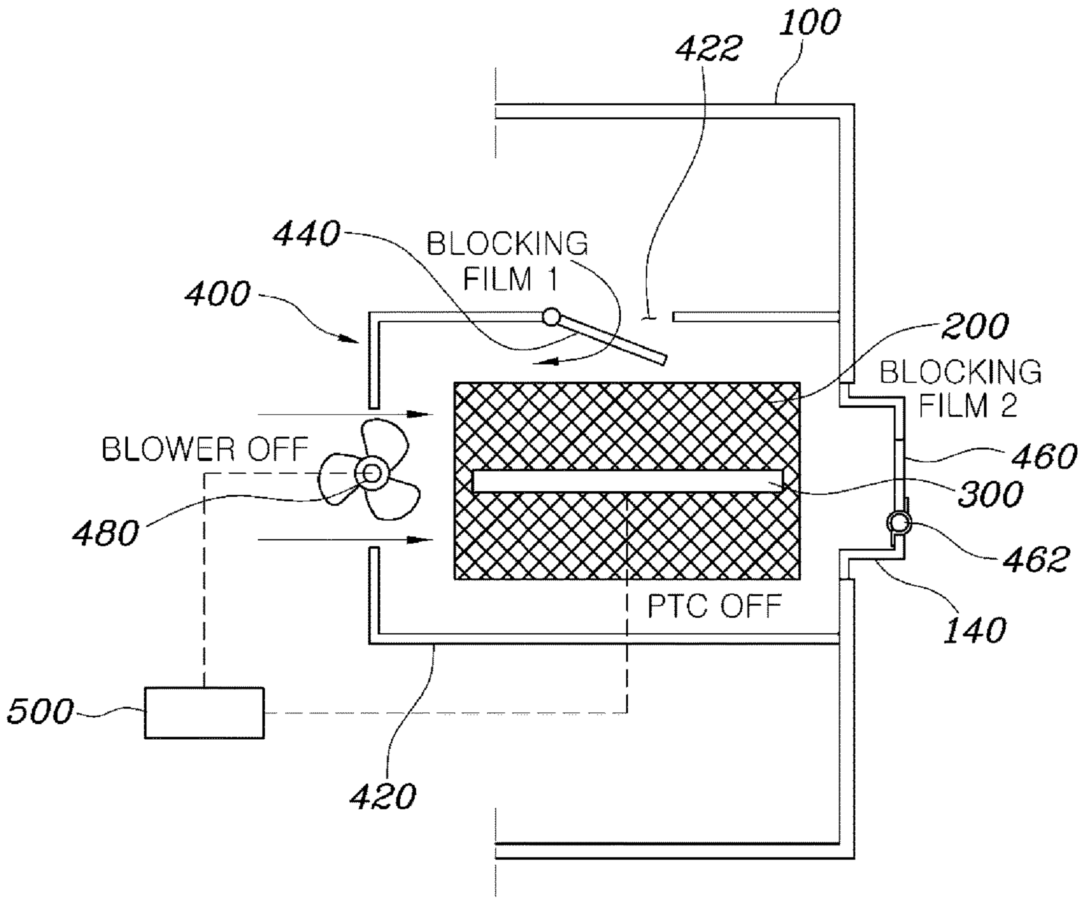
FIG. 2 and FIG. 3 are views for describing the head lamp for a vehicle including a moisture removing apparatus illustrated in FIG. 1.
Figure 3:
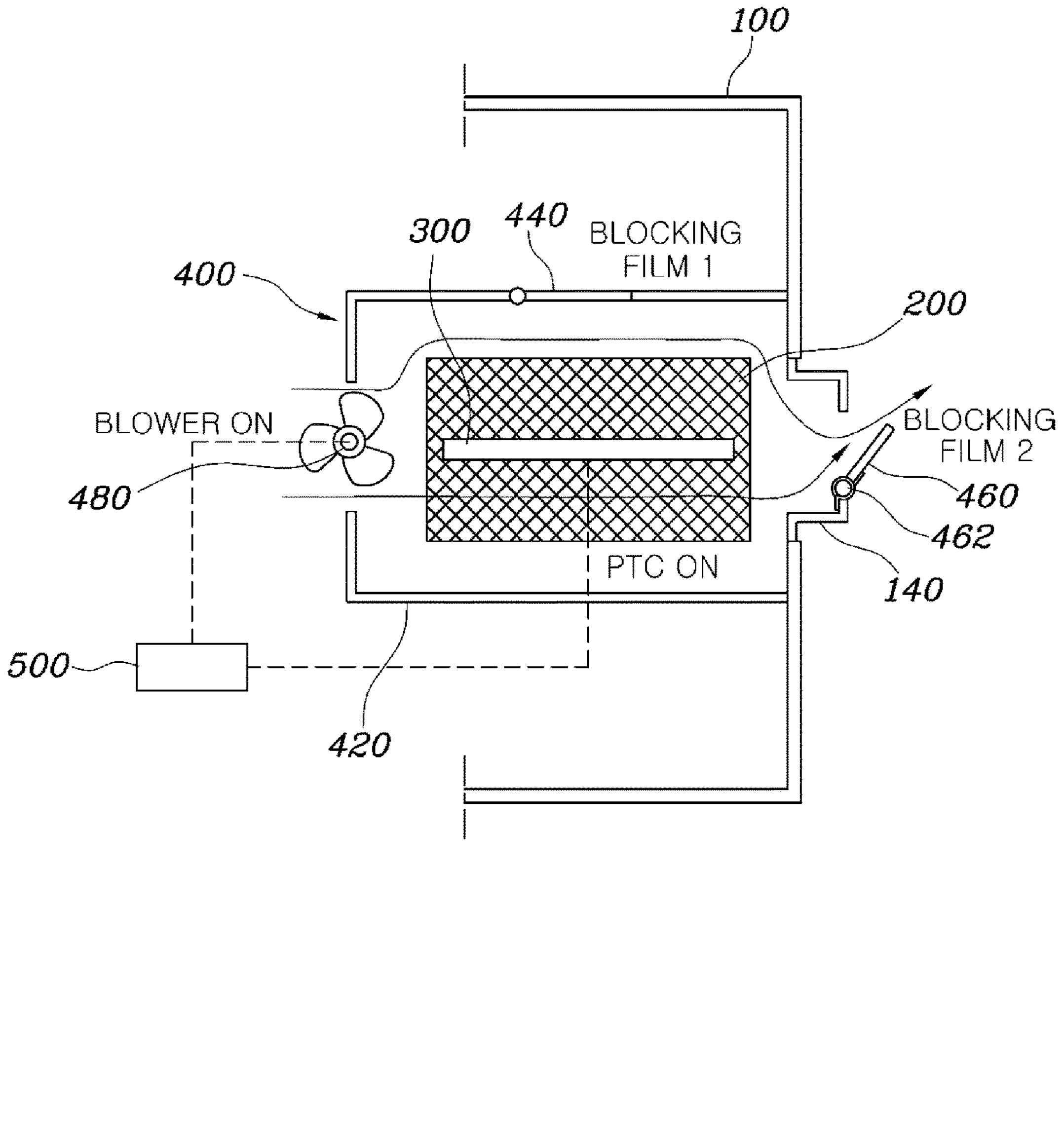

FIG. 1 is a view illustrating a head lamp for a vehicle including a moisture removing apparatus according to an exemplary embodiment of the present invention, and FIG. 2 and FIG. 3 are views for describing the head lamp for a vehicle including a moisture removing apparatus illustrated in FIG. 1.

The head lamp for a vehicle including a moisture removing apparatus according to an exemplary embodiment of the present invention includes a lamp housing 100 in which an air inlet 120 and an air outlet 140 are formed; a moisture absorbent 200 mounted adjacent to the air outlet 140 in the lamp housing 100 and absorbing moisture in the lamp housing 100; a heating device 300 mounted adjacent to the moisture absorbent 200 and heating the moisture absorbent 200 at the time of applying electric power thereto to remove the moisture absorbed by the moisture absorbent 200; and a ventilation device 400 having an inside space surrounding the moisture absorbent 200 and the heating device 300, mounted to be connected to the air outlet 140, and allowing moisture discharged by the moisture absorbent 200 dried by the heating device 300 at the time of applying the electric power thereto to be discharged through the air outlet 140, as illustrated in FIG. 1.

As described above, the head lamp for a vehicle including a moisture removing apparatus according to an exemplary embodiment of the present invention includes the lamp housing 100, the moisture absorbent 200, the heating device 300, and the ventilation device 400. Here, an external lens 102 is provided in front of the lamp housing 100, and a light source 104 and a reflector 106 are provided in the lamp housing 100.

The moisture absorbent 200 absorbing the moisture is provided in the lamp housing 100, and when the moisture absorbent 200 sufficiently absorbs the moisture to be saturated, moisture absorption is not smoothly performed. Therefore, the heating device 300 is provided as a drying means for reusing the moisture absorbent 200. Therefore, high temperature heat is generated at the time of operating the heating device 300 to dry the moisture absorbent 200 by the heating device 300, such that the moisture absorbent 200 is restored to a reusable state.

However, water included in the moisture absorbent 200 is discharged to the outside at the time of drying the moisture absorbent 200, such that moisture may be formed in the lamp housing 100. Therefore, the ventilation device 400 is provided so that the moisture generated at the time of drying the moisture absorbent 200 may be directly discharged to the outside of the lamp housing 100.

As described above, in an exemplary embodiment of the present invention, the moisture absorbent 200 is provided in the lamp housing 100 to remove the moisture, moisture absorbing performance of the moisture absorbent 200 is restored through the heating device 300, and the moisture generated at the time of restoring the moisture absorbent 200 is discharged to the outside of the lamp housing 100 by the ventilation device 400, such that the moisture in the lamp housing 100 is removed and the moisture generated at the time of drying the moisture absorbent 200 is also completely removed.

The present invention will be described in detail. As seen in FIG. 1, the air inlet 120 is formed at an upper side of the lamp housing 100 and the air outlet 140 is formed at a lower side of the lamp housing 100, such that the air inlet 120 and the air outlet 140 may be spaced apart from each other. The air inlet 120 and the air outlet 140 are formed in the lamp housing 100, such that air is introduced from the outside into the lamp housing 100 through the air inlet 120 and is then discharged through the air outlet 140. Therefore, the air is circulated in the lamp housing 100, such that the moisture may be smoothly discharged. The air inlet 120 is formed at the upper side of the lamp housing 100 and the air outlet 140 is formed at the lower side of the lamp housing 100, such that the air introduced from the outside through the air inlet 120 may be sufficiently circulated in the lamp housing 100 and be then discharged again to the outside through the air outlet 140. Therefore, an air flow in the lamp housing 100 is smooth, such that the moisture is more smoothly removed.

Meanwhile, the moisture absorbent 200 is configured to absorb the moisture, and may be configured to be reusable by discharging water at the time of being heated. The moisture absorbent 200 may be a moisture absorbing pad formed of a polymer absorbent, and may be any component as long as it may absorb water. However, to improve efficiency of the moisture absorbent 200 in an exemplary embodiment of the present invention, the moisture absorbent 200 that may absorb the water and be then dried by again removing the water by a reversible reaction generated by heating may be used. The moisture absorbent 200 may be formed of, for example, silica gel ($SiO_2$), silica gel containing cobalt chloride, calcium chloride ($CaCl_2$), magnesium sulfate ($MgSO_4$), phosphorus pentoxide ($P_2O_5$), or the like.

Meanwhile, the heating device 300 may be a positive temperature coefficient (PTC) element mounted adjacent to the moisture absorbent 200 and having a temperature rising at the time of applying the electric power thereto.

That is, the heating device 300 is formed of the PTC element, which is a resistor element, such that the heating device 300 generates heat at the time of applying the electric power thereto, and thus, a temperature of the heating device 300 rises, making it possible to dry the moisture absorbent 200 positioned adjacent to the heating device 300. Various heating device 300 that may generate the heat as well as the PTC element may be used as the heating device 300.

Meanwhile, as illustrated in FIG. 1 and FIG. 2, the ventilation device 400 may include a case 420 formed to have an inside space, mounted to be connected to the air outlet 140, and having a gateway 422 formed therein so that air in the lamp housing 100 is introduced into the inside space; a first blocking film 440 mounted in the gateway 422 of the case 420 and opening or closing the gateway 422 and a second blocking film 460 mounted in the air outlet 140 and opening or closing the air outlet 140; and a blower 480 mounted in the case 420 and blowing the air.

As described above, the ventilation device 400 includes the case 420, the first blocking film 440, the second blocking film 460, and the blower 480, and when the air in the lamp housing 100 is introduced through the gateway 422 of the case 420, the air is discharged through the air outlet 140. Here, the first blocking film 440 is mounted in the gateway 422 of the case 420, the second blocking film 460 is mounted in the air outlet 140, and the first blocking film 440 and the second blocking film 460 are operated to open or close the gateway 422 and the air outlet 140, respectively, by the blown air generated by the blower 480. Therefore, the air in the lamp housing 100 may be introduced into the case 420 or the introduced air may be discharged, depending on whether or not the blower 480 is operated.

In detail, the blower 480 and the air outlet 140 may be positioned in the case 420 to face each other, and the gateway 422 may be positioned so as not to interfere with a path on which the blower 480 and the air outlet 140 face each other. Since the blower 480 and the air outlet 140 are positioned in the case 420 to face each other as described above, when the blower 480 is operated to generate the blown air, the blown air may move in a linear direction to directly move through the air outlet 140. In addition, the gateway 422 is formed so as not to interfere with the path on which the blower 480 and the air outlet 140 face each other, such that the blown air generated in the blower 480 does not flow backward through the gateway 422.

As illustrated in FIG. 2 and FIG. 3, the blower 480 may be mounted at a front end portion of the case 420, the air outlet 140 may be formed at a rear end portion of the case 420, and the gateway 422 may be formed at an upper end portion of the case 420. Therefore, when the blower 480 mounted at the front end portion of the case 420 is operated, the air in the lamp housing 100 may forcibly move toward the air outlet 140 formed at the rear end portion of the case 420 and be then discharged through the air outlet 140. The gateway 422 is formed at the upper end portion of the case 420, such that interference of the gateway 422 with a movement path of the blown air generated in the blower 480 is minimized, preventing the blown air from moving backward thereof.

Here, the first blocking film 440 may be rotatably mounted in the gateway 422, may be maintained to open the gateway 422 at an initial position, and may close the gateway 422 by the blown air generated by the blower 480. That is, the first blocking film 440 has a rotation center point mounted at a blown air side in the gateway 422, may be maintained in a state in which it rotates downward by gravity at the initial position to open the gateway 422, and may be pushed and rotate by the blown air of the blower 480 to close the gateway 422.

Further, in order for the first blocking film 440 to be maintained in the downwardly rotated state, the first blocking film 440 may have a separate spring structure at the rotation center thereof, the first blocking film 440 may maintain the initial position thereof as the state in which the gate 422 is opened in accordance with the maintenance of the state in which the first blocking film 440 is downwardly rotated by the elasticity of the spring structure.

Meanwhile, the second blocking film 460 may be rotatably mounted in the air outlet 140, may be maintained to close the air outlet 140 at an initial position, and may open the air outlet 140 by the blown air generated by the blower 480. Here, the second blocking film 460 may be rotatably mounted in the air outlet 140, and may be maintained to close the air outlet 140 at the initial position. To this end portion, a separate spring structure may be used at a rotation center point of the second blocking film 460 to allow the second blocking film 460 to be maintained to close the air outlet 140 at the initial position. A torsion spring 462 may be used as this spring structure at the rotation center portion of the second blocking film 460 to allow the second blocking film 460 to be maintained at the initial position.

Therefore, in the ventilation device 400, when the blower 480 is not operated, the first blocking film 440 opens the gateway 422, and the second blocking film 460 closes the air outlet 140, such that the air including the moisture in the lamp housing 100 is introduced into the case 420 through the gateway 422, whereby the moisture is absorbed through the moisture absorbent 200 provided in the case 420. Here, when the moisture absorbent 200 is restored, the blower 480 is operated, such that the first blocking film 440 closes the gateway 422 and the second blocking film 460 opens the air outlet 140, whereby the air in the case 420 may be discharged through the air outlet 140.

Meanwhile, the head lamp for a vehicle including a moisture removing apparatus according to an exemplary embodiment of the present invention further includes a controller 500 applying the electric power to the heating device 300 and the ventilation device 400 to control turn-on or off the heating device 300 and the ventilation device 400, wherein the controller 500 may apply the electric power to the heating device 300 and the ventilation device 400 for a predetermined time at the time of starting up the vehicle.

As described above, the controller 500 controls the heating device 300 and the ventilation device 400 to be selectively operated. The controller 500 allows the heating device 300 and the ventilation device 400 to be driven for the predetermined time at the time of driving the vehicle, making it possible to minimize unnecessarily consumed electric power. That is, a moisture absorbing action of the moisture absorbent 200 is slowly performed through natural convection, and a long time is required for the dried moisture absorbent 200 to be saturated in a general atmosphere condition. Therefore, a drying mode of consuming a current by applying the electric power to the heating device 300 and the ventilation device 400 does not need to be repeated over a short time. Therefore, the controller 500 allows the heating device 300 and the ventilation device 400 to be operated for a set time in which the moisture absorbent 200 is sufficiently dried immediately after starting up the vehicle to minimize the unnecessarily consumed electric power, making it possible to restore the moisture absorbent 200.

An operation of the head lamp for a vehicle including a moisture removing apparatus according to an exemplary embodiment of the present invention described above will be described. At ordinary times, as illustrated in FIG. 2, the ventilation device 400 is not operated, such that the blower 480 is not operated, whereby a state in which the first blocking film 440 opens the gateway 422 and the second blocking film 460 closes the air outlet 140 is maintained. Therefore, the air including the moisture in the lamp housing 100 is introduced into the case 420 through the gateway 422, and the moisture is absorbed and removed through the moisture absorbent 200 provided in the case 420.

Then, at the time of starting up the vehicle, the controller 500 allows the heating device 300 and the ventilation device 400 to be simultaneously operated, such that the moisture absorbent 200 is dried by the heating device 300, and the moisture generated in the case 420 due to the dried moisture absorbent 200 is directly discharged through the air outlet 140 by closing the gateway 422 through the first blocking film 440 and opening the air outlet 140 through the second blocking film 460 by the operation of the blower 480.

In the head lamp for a vehicle including a moisture removing apparatus having the structure as described above, the moisture generated in the head lamp is removed by the moisture absorbent 200. The moisture absorbent 200 is dried, such that moisture absorbing performance is restored, continuously maintaining a smooth moisture absorbing function. In addition, the moisture generated during drying the moisture absorbent 200 is not again introduced into the head lamp, but is discharged to the outside, blocking the moisture from being generated in the head lamp.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A head lamp for a vehicle including a moisture removing apparatus, comprising:

a lamp housing in which an air inlet and an air outlet are formed;

a moisture absorbent mounted adjacent to the air outlet in the lamp housing and absorbing moisture in the lamp housing;

a heating device mounted adjacent to the moisture absorbent and heating the moisture absorbent at a time of applying electric power thereto to remove the moisture absorbed by the moisture absorbent; and a ventilation device having an inside space surrounding the moisture absorbent and the heating device, mounted to be connected to the air outlet, and allowing moisture discharged by the moisture absorbent dried by the heating device at the time of applying the electric power thereto to be discharged through the air outlet, wherein the ventilation device includes:

a case formed to have an inside space, mounted to be connected to the air outlet, and having a gateway formed in the case so that air in the lamp housing is introduced into the inside space;

a first blocking film mounted in the gateway of the case and opening or closing the gateway and a second blocking film mounted in the air outlet and opening or closing the air outlet; and a blower mounted in the case and blowing the air, wherein the blower and the air outlet are positioned in the case to face each other, and the blower, the gateway and the air outlet are disposed in series along the case, wherein the blower is mounted at a front end portion of the case, the air outlet is formed at a rear end portion of the case, and the gateway is formed above the blower at an upper portion of the case so as not to interfere with a path on which the blower and the air outlet face each other, and wherein the front end portion has a hole such that air outside the case flows through the hole into the case.

2. The head lamp for the vehicle including the moisture removing apparatus of claim 1, wherein the air inlet is formed at an upper side of the lamp housing and the air outlet is formed at a lower side of the lamp housing, wherein the air inlet and the air outlet are spaced apart from each other.

3. The head lamp for the vehicle including the moisture removing apparatus of claim 1, wherein the moisture absorbent is configured to absorb the moisture, and is configured to be reusable by discharging water at a time of being heated.

4. The head lamp for the vehicle including the moisture removing apparatus of claim 1, wherein the heating device is a positive temperature coefficient (PTC) element mounted adjacent to the moisture absorbent and having a temperature rising at the time of applying the electric power thereto.

5. The head lamp for the vehicle including the moisture removing apparatus of claim 1, wherein the first blocking film is rotatably mounted in the gateway, is maintained to open the gateway in an initial position thereof, and closes the gateway by the blown air generated by the blower.

6. The head lamp for the vehicle including the moisture removing apparatus of claim 1, wherein the second blocking film is rotatably mounted in the air outlet, is maintained to close the air outlet in an initial position thereof, and opens the air outlet by the blown air generated by the blower.

7. The head lamp for the vehicle including the moisture removing apparatus of claim 1, further including a controller applying the electric power to the heating device and the ventilation device to control turn-on/off the heating device and the ventilation device, wherein the controller applies the electric power to the heating device and the ventilation device for a predetermined time at a time of starting up the vehicle.

8. The head lamp for the vehicle including the moisture removing apparatus of claim 1, wherein the hole of the front end portion is continuously open so that the air outside the case is continuously communicated into the case through the hole.

* * * * *